United States Patent
Imamura et al.

(10) Patent No.: US 11,628,840 B2
(45) Date of Patent: Apr. 18, 2023

(54) VEHICLE CONTROL APPARATUS, VEHICLE CONTROL METHOD, AND VEHICLE CONTROL SYSTEM

(71) Applicant: Hitachi Automotive Systems, Ltd., Hitachinaka (JP)

(72) Inventors: Masamichi Imamura, Atsugi (JP); Satoshi Nakagawa, Hadano (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/973,495

(22) PCT Filed: Jun. 6, 2019

(86) PCT No.: PCT/JP2019/022494
§ 371 (c)(1),
(2) Date: Dec. 9, 2020

(87) PCT Pub. No.: WO2019/240002
PCT Pub. Date: Dec. 19, 2019

(65) Prior Publication Data
US 2021/0245757 A1    Aug. 12, 2021

(30) Foreign Application Priority Data
Jun. 13, 2018   (JP) .............................. JP2018-112687

(51) Int. Cl.
*B60W 30/18*       (2012.01)
*B60W 10/184*      (2012.01)
(Continued)

(52) U.S. Cl.
CPC .... *B60W 30/18145* (2013.01); *B60W 10/184* (2013.01); *B60W 10/20* (2013.01);
(Continued)

(58) Field of Classification Search
CPC ......... B60W 30/18145; B60W 10/184; B60W 10/20; B60W 30/12; B60W 30/18172;
(Continued)

(56) References Cited

U.S. PATENT DOCUMENTS

2014/0324297 A1* 10/2014 Kim ...................... B60W 10/20
                                                              701/48
2016/0297439 A1   10/2016 Inoue et al.
(Continued)

FOREIGN PATENT DOCUMENTS

JP        6-270830 A      9/1994
JP     2000-264230 A      9/2000
(Continued)

OTHER PUBLICATIONS

Extended European Search Report issued in European Application No. 19820452.1 dated Aug. 2, 2021 (nine (9) pages).
(Continued)

*Primary Examiner* — Behrang Badii
*Assistant Examiner* — Jay Khandpur
(74) *Attorney, Agent, or Firm* — Crowell & Moring LLP

(57) ABSTRACT

A vehicle control apparatus according to the present invention outputs a signal regarding a target braking/driving force for guiding a vehicle in a target traveling direction to a braking/driving controller. The signal regarding the target braking/driving force is acquired based on information regarding a running route of the vehicle and a physical amount regarding a motion state of the vehicle. The vehicle control apparatus outputs a signal regarding a steering correction torque for correcting a steering torque according to a behavior of the vehicle to a steering force controller. The signal regarding the steering correction torque is acquired based on a vehicle-body slip angle of the vehicle and the target braking/driving force.

6 Claims, 7 Drawing Sheets

(51) Int. Cl.
  *B60W 10/20* (2006.01)
  *B60W 30/12* (2020.01)
(52) U.S. Cl.
  CPC ...... *B60W 30/12* (2013.01); *B60W 30/18172* (2013.01); *B60W 2520/20* (2013.01); *B60W 2710/182* (2013.01); *B60W 2710/202* (2013.01); *B60W 2720/20* (2013.01)
(58) Field of Classification Search
  CPC ....... B60W 2520/20; B60W 2710/182; B60W 2710/202; B60W 2720/20
  See application file for complete search history.

(56) References Cited

U.S. PATENT DOCUMENTS

| | | | |
|---|---|---|---|
| 2018/0001888 A1* | 1/2018 | Takahara | B60W 30/045 |
| 2018/0079406 A1* | 3/2018 | Izumi | B62D 15/022 |
| 2018/0257631 A1* | 9/2018 | Fodor | B60W 20/30 |

FOREIGN PATENT DOCUMENTS

| | | | | |
|---|---|---|---|---|
| JP | 2005112007 A | * | 4/2005 | ............ B60T 8/172 |
| JP | 2006347186 A | * | 12/2006 | ............ B60K 11/04 |
| JP | 2016-199115 A | | 12/2016 | |
| JP | 2017-153232 A | | 8/2017 | |

OTHER PUBLICATIONS

International Search Report (PCT/ISA/210) issued in PCT Application No. PCT/JP2019/022494 dated Jul. 30, 2019 with English translation (three (3) pages).

Japanese-language Written Opinion (PCT/ISA/237) issued in PCT Application No. PCT/JP2019/022494 dated Jul. 30, 2019 with English translation (10 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system, and, more particularly, to a technique for guiding a vehicle in a target traveling direction.

BACKGROUND ART

An autonomous braking apparatus disclosed in PTL 1 is an autonomous braking apparatus including an autonomous braking unit that applies a braking force to a wheel when an obstacle is detected by an obstacle detection unit, and is equipped with a unit that makes a steering operation heavy while the autonomous braking unit is in operation.

CITATION LIST

Patent Literature

PTL 1: Japanese Patent Application Public Disclosure No. H06-270830

SUMMARY OF INVENTION

Technical Problem

However, when the behavior of the vehicle is disturbed, for example, on a slippy road and a wide deviation is generated between the vehicle target traveling direction and the actual traveling direction, making the steering torque heavy to prevent a steering error by the driver may lead to generation of a steering torque in a direction different from the driver's intention.

Then, when the steering torque is generated in the direction different from the driver's intention, the driver may feel as if the vehicle is not moving as intended by the driver, thereby feeling anxious.

However, if the steering torque for guiding the vehicle in the target traveling direction is reduced with the aim of easing the driver's anxiety, this reduction may delay the conversion to the targeted steering angle of the steering, thereby making it difficult to guide the vehicle in the target traveling direction.

Alternatively, the vehicle traveling direction can be guided in the target traveling direction without causing a change in the steering torque of the steering by a steer-by-wire steering system, which disconnects the mechanical link between a steering angle of a tire that determines the vehicle traveling direction, and the steering angle of the steering, and separately performs the control on the steering angle of the tire and the control on the steering angle of the steering.

However, the steer-by-wire steering system has such a problem that the system is complicated and the cost increases.

An object of the present invention is to provide a vehicle control apparatus, a vehicle control method, and a vehicle control system that can accurately guide a vehicle in a target traveling direction while providing a steering torque not making a driver feel anxious with a simple structure.

Solution to Problem

According to one aspect of the present invention, in one configuration thereof, a vehicle control apparatus, a vehicle control method, and a vehicle control system output a signal regarding a target braking/driving force for guiding a vehicle in a target traveling direction to a braking/driving controller configured to control a braking/driving actuator of the vehicle. The signal regarding the target braking/driving force is acquired based on information regarding a running route of the vehicle and a physical amount regarding a motion state of the vehicle. The vehicle control apparatus, the vehicle control method, and the vehicle control system output a signal regarding a steering correction torque for correcting a steering torque according to a behavior of the vehicle to a steering force controller configured to control a steering actuator of the vehicle. The signal regarding the steering correction torque is acquired based on a vehicle-body slip angle and the target braking/driving force. The vehicle-body slip angle is acquired based on the physical amount regarding the motion state of the vehicle.

Advantageous Effects of Invention

According to the one aspect of the present invention, while the vehicle is guided in the target traveling direction with the aid of the control of the braking/driving force, the steering torque is corrected according to the behavior of the vehicle, which makes it possible to accurately guide the vehicle in the target traveling direction while providing the steering torque not making the driver feel anxious.

DESCRIPTION OF EMBODIMENTS

In the following description, embodiments of a vehicle control apparatus, a vehicle control method, and a vehicle control system according to the present invention will be described with reference to the drawings.

Figure 1:
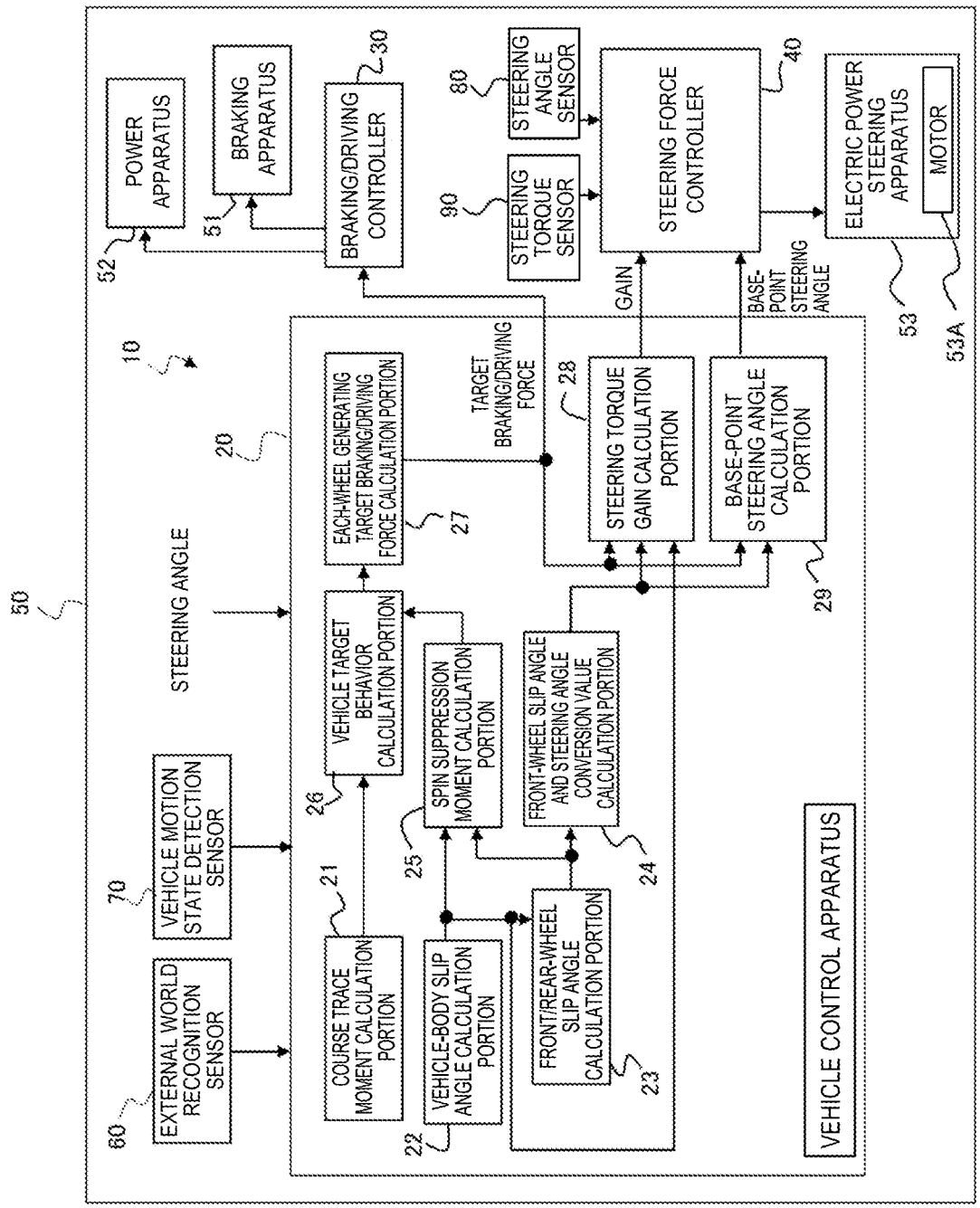
FIG. 1 illustrates the overall configuration of a vehicle control system.

FIG. 1 is a block diagram illustrating one embodiment of a vehicle control system.

A vehicle control system 10 illustrated in FIG. 1 includes a vehicle control apparatus 20, a braking/driving controller 30, and a steering force controller 40.

The vehicle control apparatus 20, the braking/driving controller 30, and the steering force controller 40 are each an electronic control apparatus including a microcomputer equipped with a CPU (Central Processing Unit), a ROM (Read Only Memory), a RAM (Random Access Memory), and the like, and the vehicle control apparatus 20 transmits various kinds of instruction signals to the braking/driving controller 30 and the steering force controller 40 for assisting driving.

A vehicle 50, on which the vehicle control system 10 is mounted, includes a braking apparatus 51, a power apparatus 52, and an electric power steering apparatus 53. The braking apparatus 51 is, for example, a hydraulic brake system capable of electronically controlling a braking force for each wheel. The power apparatus 52 is, for example, an internal combustion engine capable of electronically controlling an output torque. The electric power steering apparatus 53 is one example of a power steering apparatus capable of electronically controlling a steering torque (a steering force).

The electric power steering apparatus 53 is a mechanism that turns front wheels, which are turning target wheels, according to a rotation of a steering wheel, and is a steering actuator including a motor 53A that generates an assist torque assisting a steering operation performed by a driver.

The braking/driving controller 30 has a function of controlling the braking apparatus 51 and the power apparatus 52, i.e., a braking/driving actuator as software.

Further, the steering force controller 40 has a function of controlling the electric power steering apparatus 53, i.e., a steering actuator as software.

The steering force controller 40 generates a target steering torque based on, for example, a steering angle of the steering, and controls the assist torque (a motor torque) to be output by the electric power steering apparatus 53 in such a manner that the actual steering torque becomes closer to the target steering torque.

The target steering torque generated based on the steering angle of the steering is basically zero at a neutral position, and is set to a further larger torque according to an increase in the steering angle of leftward steering or the steering angle of rightward steering from the neutral position.

Further, the vehicle 50 includes an external world recognition sensor 60, which recognizes a running route of the vehicle 50, i.e., course information such as a curve curvature, an obstacle, and the like by using both a camera, a radar, or a GPS (Global Positioning System), and map information.

Further, the vehicle 50 includes a vehicle motion state detection sensor 70, which detects various kinds of physical amounts regarding the motion state of the vehicle 50. The vehicle motion state detection sensor 70 includes, for example, a yaw rate sensor and an acceleration sensor.

The vehicle control apparatus 20, which is one embodiment of the vehicle control apparatus, inputs the information regarding the running route of the vehicle 50, which is transmitted from the external world recognition sensor 60, and the physical amount regarding the motion state of the vehicle 50, such as the yaw rate and the acceleration transmitted from the vehicle motion state detection sensor 70, and, further inputs, for example, information about the steering angle of the steering of the electric power steering apparatus 53.

Then, the vehicle control apparatus 20 calculates a target braking/driving force for guiding the vehicle 50 in a target traveling direction based on the input various kinds of signals and information, and also calculates a steering correction torque for correcting the steering torque according to the vehicle behavior.

The vehicle control apparatus 20 calculates the above-described steering correction torque as a gain of the steering torque and a base-point steering angle, as will be described below. In other words, the vehicle control apparatus 20 corrects the steering torque (the steering force) by changing the gain of the steering torque and the base-point steering angle according to the vehicle behavior.

Then, the vehicle control apparatus 20 transmits a signal regarding the target braking/driving force to the braking/driving controller 30, and also transmits a signal regarding the gain of the steering torque and the base-point steering angle, i.e., a signal regarding the steering correction torque to the steering force controller 40.

The braking/driving controller 30 controls the braking/driving force of each wheel based on the target braking/driving force transmitted from the vehicle control apparatus 20.

Further, the steering force controller 40 changes a characteristic regarding the generation of the target steering torque according to the steering angle of the steering based on the gain of the steering torque and the base-point steering angle transmitted from the vehicle control apparatus 20, and controls the assist torque based on the target steering torque generated based on the characteristic after the change.

The vehicle control apparatus 20 has functions corresponding to a course trace moment calculation portion 21, a vehicle-body slip angle calculation portion 22, a front/rear-wheel slip angle calculation portion 23, a front-wheel slip angle and steering angle conversion value calculation portion 24, a spin suppression moment calculation portion 25, a vehicle target behavior calculation portion 26, an each-wheel generating target braking/driving force calculation portion 27, a steering torque gain calculation portion 28, and a base-point steering angle calculation portion 29 as software to calculate the target braking/driving force, the gain of the steering torque, and the base-point steering angle.

The course trace moment calculation portion 21 calculates a curve curvature of a road ahead of the running vehicle 50 based on the current position of the vehicle 50 identified based on the information transmitted from the external world recognition sensor 60, predetermined road route information that the vehicle 50 is planned to run, and the like, and calculates a moment that should be provided to the vehicle 50 to trace the calculated curve curvature.

The vehicle-body slip angle calculation portion 22 calculates a vehicle-body slip angle $\beta s$ based on, for example, the yaw rate and the lateral acceleration transmitted form the vehicle motion state detection sensor 70.

The front/rear-wheel slip angle calculation portion 23 calculates a front-wheel slip angle $\beta f$ and a rear-wheel slip angle $\beta r$ based on the vehicle-body slip angle $\beta s$ calculated by the vehicle-body slip angle calculation portion 22 and further based on a front-wheel steering angle $\delta$, the yaw rate, a vehicle speed, and the like.

The front-wheel slip angle and steering angle conversion value calculation portion 24 converts the front-wheel slip angle $\beta f$ calculated by the front/rear-wheel slip angle calculation portion 23 into a steering angle of the front wheel based on the correlation between the steering angle of the steering and a tire turning angle, which is specific to the vehicle 50.

The spin suppression moment calculation portion 25 calculates a moment that should be provided to the vehicle 50 to suppress an expressive yaw moment generated on the vehicle 50 based on the speed of a change in the yaw rate and the like.

The vehicle target behavior calculation portion 26 calculates a final moment that should be provided to the vehicle 50 based on the moment for tracing the course (a course trace moment) that is calculated by the course trace moment calculation portion 21 and the moment for suppressing the excessive yaw moment (a spin suppression moment) that is calculated by the spin suppression moment calculation portion 25.

Now, the vehicle target behavior calculation portion 26 can calculate a total value of the moment for tracing the course and the moment for suppressing the excessive yaw moment as the final moment that should be provided to the vehicle 50.

Alternatively, the vehicle target behavior calculation portion 26 can calculate a larger one of the moment for tracing the course and the moment for suppressing the excessive yaw moment as the final moment that should be provided to the vehicle 50.

The each-wheel generating target braking/driving force calculation portion 27 calculates a braking/driving force (a target braking/driving force) of each wheel that is required to provide the moment calculated by the vehicle target behavior calculation portion 26 to the vehicle 50.

In other words, the vehicle control apparatus 20 carries out driving assist of guiding the vehicle 50 in the target traveling direction by controlling the braking/driving force of each wheel to adjust the moment to provide to the vehicle 50.

The steering torque gain calculation portion 28 calculates the gain of the steering torque based on the vehicle-body slip angle βs calculated by the vehicle-body slip angle calculation portion 22, the front-wheel slip angle and steering angle conversion value calculated by the front-wheel slip angle and steering angle conversion value calculation portion 24, and the target braking/driving force of each wheel that is calculated by the each-wheel generating target braking/driving force calculation portion 27.

In other words, the vehicle control apparatus 20 changes the target steering torque with respect to the steering angle of the steering so as to increase/reduce it, by changing the gain to instruct to the steering angle controller 40 to apply.

The gain of the steering torque is an instruction for changing the target steering torque with respect to the steering angle so as to increase/reduce it, and may be a correction coefficient of the target steering torque, a shift amount of the target steering torque, a signal for selecting a map (a calculation equation) of the target steering torque, or the like.

The base-point steering angle calculation portion 29 calculates the base-point steering angle, which is the steering angle that makes the steering torque zero, based on the front-wheel slip angle and steering angle conversion value calculated by the front-wheel slip angle and steering angle conversion value calculation portion 24 and the target braking/driving force of each wheel that is calculated by the each-wheel generating target braking/driving force calculation portion 27.

The vehicle control apparatus 20 can change the steering angle to return to due to a steering reaction force by changing the base-point steering angle, and allows the steering performed by the driver to guide in a direction for stabilizing the vehicle behavior with the aid of the setting of the base-point steering angle.

Then, the vehicle control apparatus 20 transmits the signals regarding the gain of the steering torque calculated by the steering torque gain calculation portion 28 and the base-point steering angle calculated by the base-point steering angle calculation portion 29 to the steering force controller 40, and transmits the signal regarding the target braking/driving force of each wheel that is calculated by the each-wheel generating target braking/driving force calculation portion 27 to the braking/driving controller 30.

Figure 2:
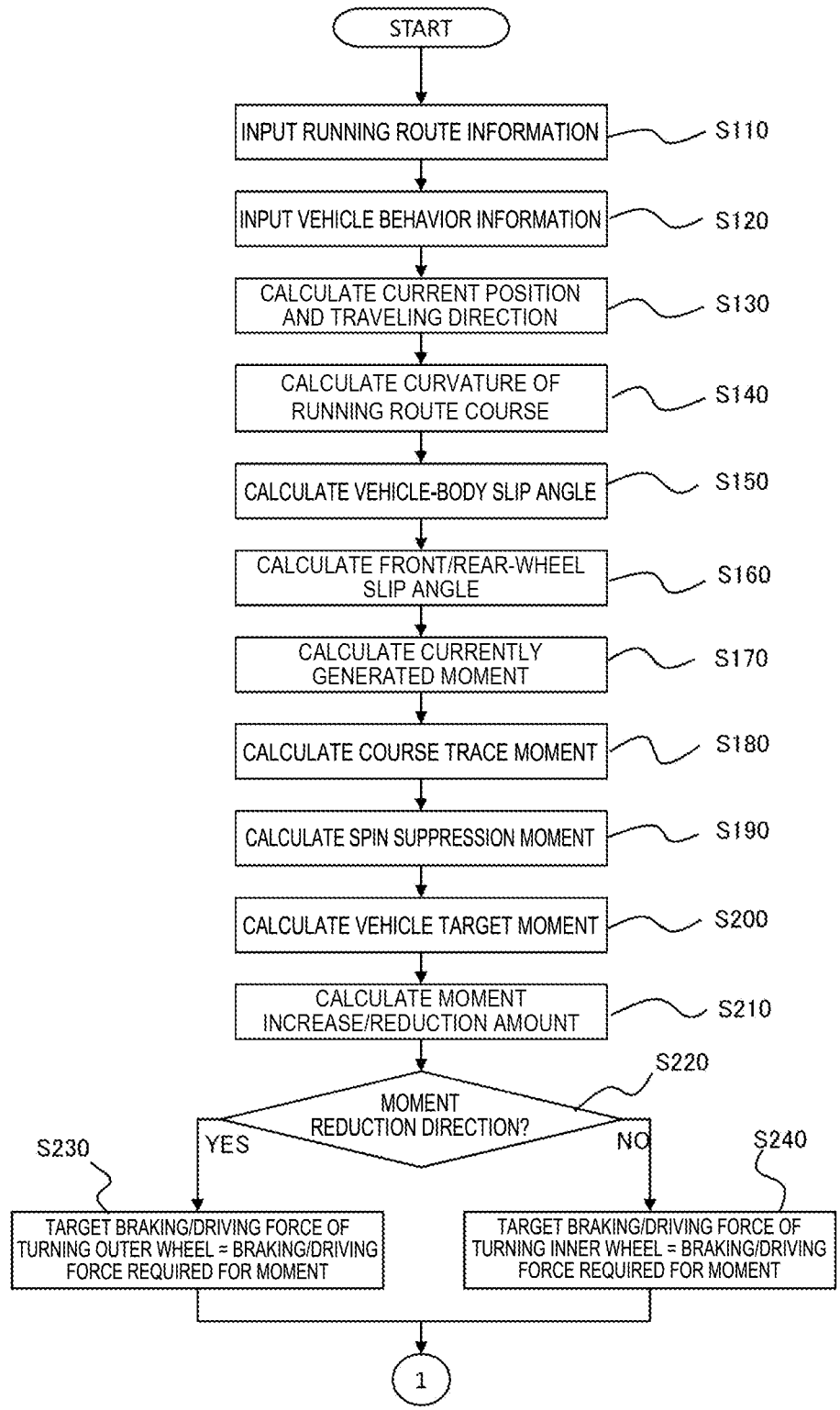
FIG. 2 is a flowchart illustrating processing for calculating a target braking/driving force, a gain of a steering torque, and a base-point steering angle.
Figure 3:
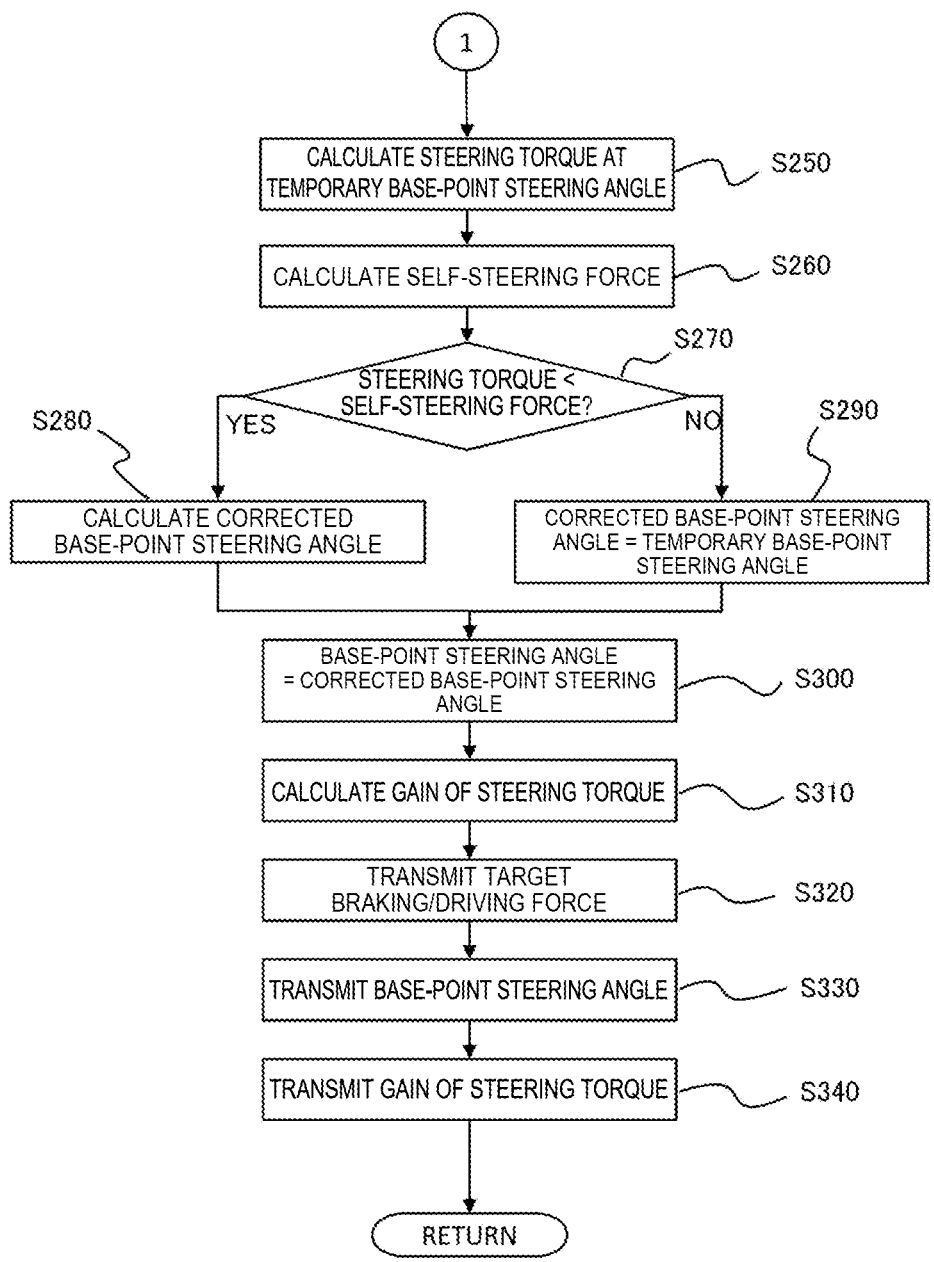
FIG. 3 is a flowchart illustrating the processing for calculating the target braking/driving force, the gain of the steering torque, and the base-point steering angle.

Next, processing for calculating and transmitting the gain of the steering torque, the base-point steering angle, and the target braking/driving force, which is performed by the vehicle control apparatus 20, will be described in detail according to flowcharts illustrated in FIGS. 2 and 3.

In step S110, the vehicle control apparatus 20 receives the information regarding the running route of the vehicle 50 that is transmitted from the external world recognition sensor 60, i.e., the information about the runnable road, the obstacle, and the like.

Next, in step S120, the vehicle control apparatus 20 receives the vehicle behavior information such as the yaw rate, the longitudinal acceleration, and the lateral acceleration transmitted form the vehicle motion state detection sensor 70.

Then, in step S130, the vehicle control apparatus 20 calculates the current position of the vehicle 50 and the target traveling direction based on the information regarding the running route of the vehicle 50.

For example, the vehicle control apparatus 20 roughly identifies the current position of the vehicle 50 with use of the GPS and recognizes which position the vehicle 50 is located on the road map.

Further, the vehicle control apparatus 20 identifies which position the vehicle 50 is located on the road by recognizing, for example, a white line on the road surface from an image ahead of the vehicle that is captured by the camera, thereby determining the current position of the vehicle 50 and the target traveling direction.

Next, in step S140, the vehicle control apparatus 20 recognizes the route along which the vehicle 50 is planned to run based on the current position of the vehicle 50 and the target traveling direction, the information about the road map, and the like, and calculates the curve curvature of the running route (course) along which the vehicle will run from now.

Further, in step S150, the vehicle control apparatus 20 calculates the vehicle-body slip angle βs.

For example, the vehicle control apparatus 20 calculates the vehicle-body slip angle βs by integrating the difference between the yaw rate and the lateral acceleration according to an equation 1.

$$\beta s = \int \left( \frac{Y_g}{V_x} - \frac{d\gamma}{dt} \right) dt \quad \text{[Equation 1]}$$

In the equation 1, βs represents the vehicle-body slip angle, Yg represents the lateral acceleration, Vx represents the vehicle longitudinal speed (the vehicle speed), and dγ/dt represents the yaw rate.

Next, in step S160, the vehicle control apparatus 20 calculates the front-wheel slip angle βf and the rear-wheel slip angle βr based on the vehicle-body slip angle βs, the front-wheel steering angle δ, the yaw rate, the vehicle speed, and the like.

For example, the vehicle control apparatus 20 calculates the front-wheel slip angle βf and the rear-wheel slip angle βr according to an equation 2.

$$\beta f = \left( \beta s + \frac{l_f}{V_x} \frac{d\gamma}{dt} - \delta \right) \quad \text{[Equation 2]}$$

$$\beta r = \left( \beta s - \frac{l_r}{V_x} \frac{d\gamma}{dt} \right)$$

In the equation 2, βf represents the front-wheel slip angle, βr represents the rear-wheel slip angle, lf represents the distance from the front axle to the position of the center of gravity, lr represents the distance from the rear axle to the position of the center of gravity, and δ represents the front-wheel steering angle.

Next, in step S170, the vehicle control apparatus 20 calculates a vehicle moment M causing the vehicle-body slip angle βs, for example, according to an equation 3.

$$M = I \frac{d^2\gamma}{dt^2} \quad \text{[Equation 3]}$$

In the equation 3, M represents the vehicle moment, I represents a vehicle inertial moment, and d2γ/dt2 represents a differential value of the yaw rate.

Next, in step S180, the vehicle control apparatus 20 calculates a course trace moment Mc, which is a moment for turning along the curve curvature calculated in step S140.

The vehicle control apparatus 20 first calculates a yaw rate dγc/dt required to run along the curve curvature according to an equation 4 based on a curve curvature 1/ρ (ρ: a turning radius) and the vehicle speed Vx.

$$\frac{d\gamma c}{dt} = v_x \frac{1}{\rho} \quad \text{[Equation 4]}$$

Next, the vehicle control apparatus 20 calculates the course trace moment Mc required to allow the current yaw rate dγ/dt to match the yaw rate dγc/dt according to the curve curvature by the time the vehicle 50 reaches a target position according to an equation 5.

$$Mc = I \frac{\frac{d\gamma c}{dt} - \frac{d\gamma}{dt}}{\Delta t} \quad \text{[Equation 5]}$$

In the equation 5, Δt represents the time since the current position until the vehicle 50 reaches the target position.

Next, in step S190, the vehicle control apparatus 20 calculates a spin suppression moment Ms, which is a moment for correcting the vehicle behavior when the behavior of the vehicle 50 is disturbed.

For example, the vehicle control apparatus 20 calculates the spin suppression moment Ms according to an equation 6 with use of the vehicle-body slip angle βs and the yaw rate differential value d2γ/dt2, which are indexes of the spin state.

$$Ms = Ks1 \cdot \beta s + Ks2 \cdot \frac{d^2\gamma}{dt^2} \quad \text{[Equation 6]}$$

In the equation 6, Ks1 represents a gain of the slip angle for moment control, and Ks2 represents a gain of the yaw rate differential value for moment control.

Next, in step S200, the vehicle control apparatus 20 calculates a vehicle target moment Mt, which is the moment that should be generated on the vehicle 50 finally.

For example, the vehicle control apparatus 20 can determine a total value of the course trace moment Mc required to allow the current yaw rate dγ/dt to match the yaw rate dγc/dt according to the curve curvature by the time the vehicle 50 reaches the target position, and the spin suppression moment Ms as the final vehicle target moment Mt (Mt=Mc+Mt).

Alternatively, the vehicle control apparatus 20 can determine a larger one of the course trace moment Mc required to allow the current yaw rate dγ/dt to match the yaw rate dγc/dt according to the curve curvature by the time the vehicle 50 reaches the target position, and the spin suppression moment Ms as the final vehicle target moment Mt (Mt=MAX(Mc,Mt)).

Next, in step S210, the vehicle control apparatus 20 calculates a deviation amount ΔM between the vehicle moment M generated on the vehicle 50 at present and the vehicle target moment Mt (ΔM=Mt−M).

Further, in step S220, the vehicle control apparatus 20 compares the vehicle moment M generated on the vehicle 50 at present and the vehicle target moment Mt, and determines whether the direction for changing the vehicle moment M to achieve the vehicle target moment Mt is an increase direction or a reduction direction.

At this time, the vehicle control apparatus 20 determines that the direction for changing the vehicle moment M to achieve the vehicle target moment Mt is the reduction direction if the signs of the vehicle moment M and the vehicle target moment Mt are opposite from each other, i.e., the direction of the vehicle moment M generated on the vehicle 50 at present and the direction indicated by the vehicle target moment Mt are opposite from each other.

The vehicle control apparatus 20 determines that the direction for changing the vehicle moment M to achieve the vehicle target moment Mt is the reduction direction if the vehicle moment M is greater than the vehicle target moment Mt even when the signs of the vehicle moment M and the vehicle target moment Mt are the same.

On the other hand, the vehicle control apparatus 20 determines that the direction for changing the vehicle moment M to achieve the vehicle target moment Mt is the increase direction if the signs of the vehicle moment M and the vehicle target moment Mt are the same and the vehicle moment M is smaller than the vehicle target moment Mt.

If determining that the direction for changing the vehicle moment M to achieve the vehicle target moment Mt is the reduction direction in step S220, the vehicle control apparatus 20 proceeds from step S220 to step S230.

When the direction for changing the vehicle moment M to achieve the vehicle target moment Mt is the reduction direction, it is appropriate to brake a turning outer wheel to achieve the vehicle target moment Mt.

Therefore, in step S230, the vehicle control apparatus 20 calculates a target value of the braking force to apply to the turning outer wheel based on the deviation amount ΔM calculated in step S210.

In other words, in step S230, the vehicle control apparatus 20 calculates the target value of the braking force to apply to the turning outer wheel to achieve the vehicle target moment Mt according to the deviation amount ΔM between the vehicle moment M generated on the vehicle 50 at present and the vehicle target moment Mt.

For example, when a clockwise moment is generated on the vehicle 50, the front left wheel and the rear left wheel serve as the turning outer wheel. Then, in this case, in step S230, the vehicle control apparatus 20 calculates a target braking/driving force TGFx(fl) of the front left wheel fl and a target braking/driving force TGFx(rl) of the rear left wheel rl according to an equation 7.

$$TGFx(fl) = \Delta M / Tr * Kfx$$

$$TGFx(rl) = \Delta M / Tr * (1 - Kfx) \quad \text{[Equation 7]}$$

In the equation 7, TGFx(-) represents the target braking/driving force of each wheel, Tr represents left/right-wheel tire tread/2, and Kfx represents a weight coefficient determining the assignment (distribution) of the braking force to the front and rear wheels.

The vehicle control apparatus 20 can store the weight coefficient Kfx in a memory as a fixed value, or can variably set the weight coefficient Kfx according to the driving situation such as the weight distribution to the front and rear wheels and the vehicle deceleration of the vehicle 50.

On the other hand, if determining that the direction for changing the vehicle moment M to achieve the vehicle target moment Mt is the increase direction in step S220, the vehicle control apparatus 20 proceeds from step S220 to step S240.

When the direction for changing the vehicle moment M to achieve the vehicle target moment Mt is the increase direction, it is appropriate to brake a turning inner wheel to achieve the vehicle target moment Mt in an opposite manner from when this direction is the reduction direction.

Therefore, in step S240, the vehicle control apparatus 20 calculates a target value of the braking force to apply to the turning inner wheel based on the deviation amount $\Delta M$ calculated in step S210.

In other words, in step S240, the vehicle control apparatus 20 calculates the target value of the braking force to apply to the turning inner wheel to achieve the vehicle target moment Mt according to the deviation amount $\Delta M$ between the vehicle moment M generated on the vehicle 50 at present and the vehicle target moment Mt.

For example, when the clockwise moment is generated on the vehicle 50, the front right wheel and the rear right wheel serve as the turning inner wheel, and the vehicle control apparatus 20 calculates a target braking/driving force TGFx (fr) of the front right wheel fr and a target braking/driving force TGFx(rr) of the rear right wheel rr in a similar manner to the equation 7.

In this manner, the vehicle control apparatus 20 calculates the target braking/driving force TGFx(-) to guide the vehicle 50 in the target traveling direction based on the information regarding the running route of the vehicle 50 and the physical amount regarding the motion state of the vehicle 50.

Next, the vehicle control apparatus 20 proceeds to step S250 and the steps subsequent thereto, and calculates the steering torque (the steering force).

First, in step S250, the vehicle control apparatus 20 temporarily calculates the base-point steering angle, which is the steering angle that makes the steering torque zero (the steering reaction force becomes zero).

Because changing the base-point steering angle leads to a correction made to the steering torque, the base-point steering angle is the signal regarding the steering correction torque for correcting the steering torque.

Further, as will be described below, the temporary base-point steering angle is the base-point steering angle changed according to the front-wheel slip angle $\beta f$, and the final base-point steering angle is the base-point steering angle into which the base-point steering angle according to the front-wheel slip angle $\beta f$ is changed according to the target braking/driving force for guiding the vehicle 50 in the target traveling direction.

In other words, the vehicle control apparatus 20 calculates the base-point steering angle, which is the signal regarding the steering correction torque, based on the front-wheel slip angle $\beta f$ and the target braking/driving force.

In step S250, the vehicle control apparatus 20 sets the base-point steering angle to a steering angle at which the front-wheel slip angle $\beta f$ is equivalent to zero.

Figure 4:
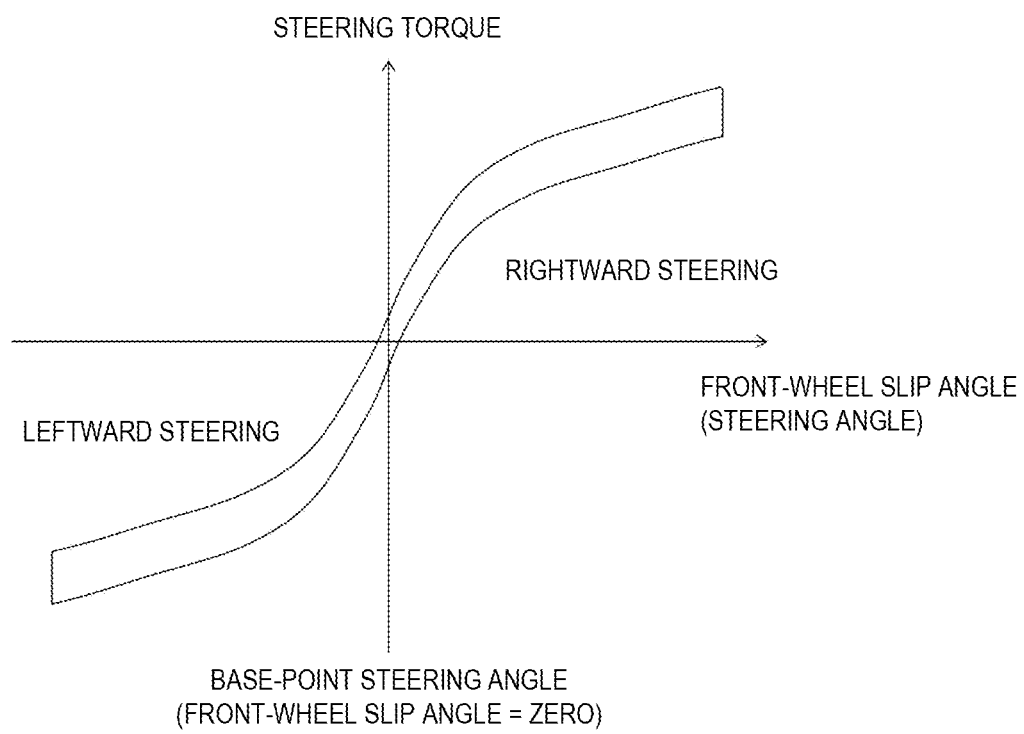
FIG. 4 is a diagram illustrating a correlation between a front-wheel slip angle (steering angle) and the steering torque.

The steering force controller 40 functions based on such a characteristic that a larger target steering torque is generated as the steering angle of the steering increases from the neutral position as illustrated in FIG. 4, and is supposed to generate the target steering torque according to the basic characteristic in a state that the steering angle at which the front-wheel slip angle $\beta f$ is equivalent to zero corresponds to the neutral position of the steering, i.e., a state in which the steering angle of the steering and the front-wheel slip angle $\beta f$ generally correspond to each other.

On the other hand, when the steering angle at which the front wheel slip angle $\beta f$ is equivalent to zero is shifted from the neutral position of the steering, this means that the target steering torque is generated as zero at the base-point steering angle shifted from the neutral position, and a larger target steering torque is generated as the leftward/rightward steering angle from this base-point steering angle increases.

Then, when the base-point steering angle that makes the target steering torque zero is shifted from the neutral position of the steering, the steering reaction force is applied toward the base-point steering angle that makes the target steering torque zero, by which the steering by the driver can be guided toward an arbitrary base-point steering angle.

Now, in a state that the braking/driving force is not applied to the tire on a normal vehicle, the steering reaction force is approximately proportional to a tire lateral force and the tire lateral force is approximately proportional to the front-wheel tire slip angle.

Then, when the posture of the vehicle 50 is considerably disturbed, for example, at the time of a spin, the lateral force of the front wheel induces a spin, and therefore reducing the lateral force of the front wheel leads to prevention of the spin.

Therefore, the vehicle control apparatus 20 sets the base-point steering angle at which the steering reaction force becomes zero to the steering angle at which the front-slip angle $\beta f$ is equivalent to zero, and prompts the driver to perform such steering that the lateral force of the front wheel becomes zero by applying the steering reaction force in a direction for causing the front-wheel slip angle $\beta f$ to become zero (i.e., a direction for reducing the front-wheel slip angle $\beta f$).

More specifically, the steering angle at which the front wheel slip angle $\beta f$ is equivalent to zero is the steering angle capable of eliminating generation of a moment due to unnecessary front-wheel steering when the vehicle 50 spins, and the vehicle control apparatus 20 can assist the driver's steering in the direction for stabilizing the vehicle behavior by setting the steering angle at which the front-wheel slip angle $\beta f$ is equivalent to zero as the base-point steering angle.

Therefore, the vehicle control apparatus 20 can realize the steering reaction force felt natural for the driver's steering that attempts to stabilize the vehicle behavior, thereby allowing the driver to perform the steering so as to correct the vehicle behavior while preventing the driver from feeling anxious.

On the other hand, the vehicle 50 is guided in the target traveling direction with the aid of the braking/driving moment due to the braking/driving force that the vehicle control apparatus 20 instructs the braking/driving controller 30 to achieve, and therefore the vehicle control apparatus 20 can guide the vehicle 50 in the target traveling direction while preventing the driver from feeling uncomfortable.

Then, when the braking/driving moment for guiding the vehicle 50 in the target traveling direction is provided by applying the target braking/driving force calculated in step S230 or step S240 to the turning outer wheel or the turning inner wheel, a self-steering force is applied to the tire and a change is also made in the reaction force applied to the steering due to the braking/driving force.

Therefore, an increase in the self-steering force due to the braking/driving force for guiding the vehicle 50 in the target traveling direction may cause a change in the steering angle of the steering in a direction different from the direction intended by the driver, thereby making the driver feel uncomfortable.

Therefore, in step S260 to step S290, the vehicle control apparatus 20 sets the steering correction torque for preventing the change in the steering angle of the steering due to the self-steering.

First, in step S260, the vehicle control apparatus 20 calculates a self-steering force based on the target braking/driving force TGFx(-) calculated in step S230 or step S240.

The self-steering force is determined based on the suspension geometry of the vehicle 50, and is approximately proportional to the braking force and is also applied in opposite directions on the left side and the right side.

Therefore, the vehicle control apparatus 20 calculates the self-steering force by multiplying the target braking/driving forces TGFx(fl) and TGFx(fr) of the front wheels by a gain specific to the vehicle as indicated by an equation 8.

$$F\_ss = (TGFx(fl) - TGFx(fr)) * Kfxst \quad \text{[Equation 8]}$$

In the equation 8, F_ss represents the self-steering force, and Kfxst represents the gain for calculating the self-steering force F_ss.

Next, the vehicle control apparatus 20 proceeds to step S270, and determines a target steering torque SFp at the current steering angle from the steering torque characteristic (refer to FIG. 4) based on the base-point steering angle temporarily determined in step S250, and compares the target steering torque SFp and the self-steering force F_ss.

Figure 5:
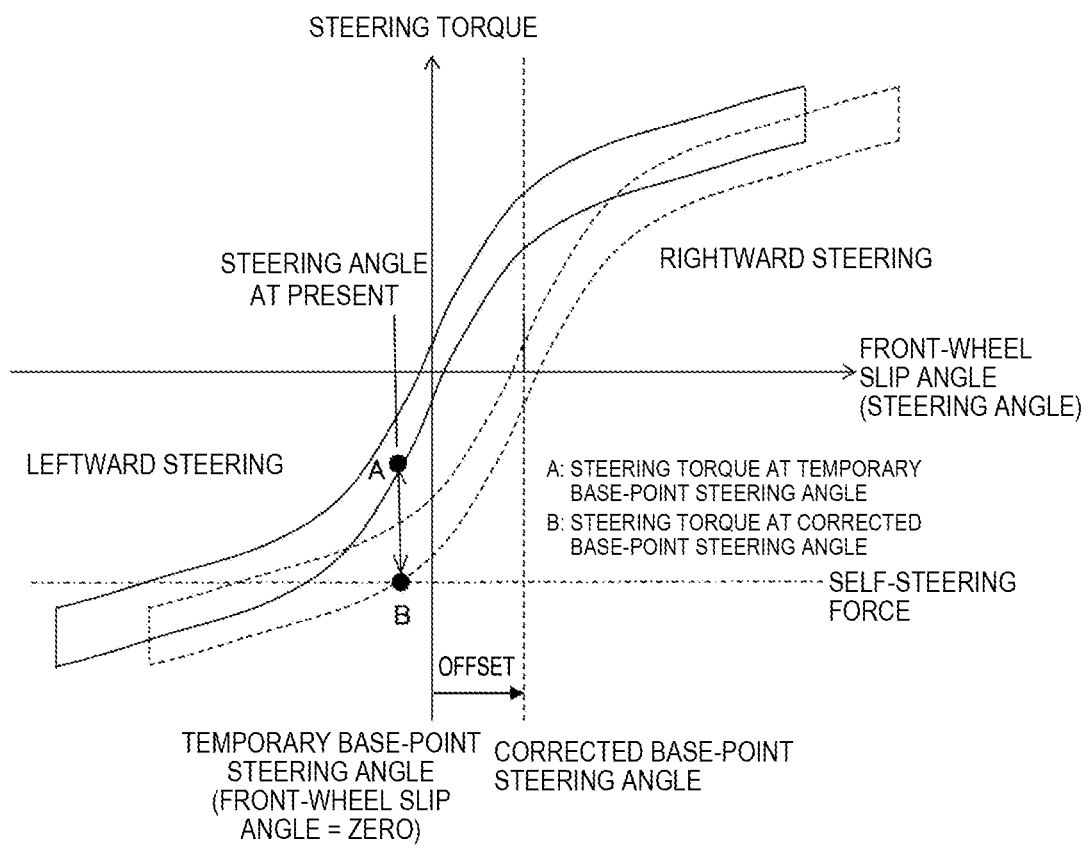
FIG. 5 is a diagram illustrating the correlation between the front-wheel slip angle (steering angle) and the steering torque for facilitating a better understanding of processing for shifting the base-point steering angle.

For example, when a point A in FIG. 5 corresponds to the target steering torque SFp at the current steering angle, the steering angle of the steering may be changed due to the braking/driving force for guiding the vehicle 50 in the target traveling direction if this target steering torque SFp is smaller than the self-steering force F_ss at a point B in FIG. 5.

To prevent the steering angle of the steering from being changed due to the braking/driving force for guiding the vehicle 50 in the target traveling direction, the vehicle control apparatus 20 corrects the base-point steering angle so as to achieve the target steering torque SFp greater than the self-steering force F_ss at the current steering angle and sets it as a corrected base-point steering angle when the target steering torque SFp is smaller than the self-steering force F_ss.

For example, in FIG. 5, the target steering torque SFp (the point A in FIG. 5) at the current steering angle (a leftward steering state) is smaller than the self-steering force F_ss (the point B in FIG. 5) in the steering torque characteristic based on the base-point steering angle temporarily determined in step S250, but the target steering torque SFp at the current steering angle is increased by offsetting the base-point steering angle that makes the target steering torque SFp zero in the rightward steering direction.

Therefore, the vehicle control apparatus 20 determines an offset amount for the base-point steering angle that allows the target steering torque SFp at the current steering angle to reach or exceed the self-steering force F_ss, and sets the steering angle shifted from the temporary base-point steering angle by this offset amount as the corrected base-point steering angle.

More specifically, the vehicle control apparatus 20 gradually shifts the curve indicating the steering torque in the direction for increasing the target steering torque SFp at the steering angle at present, and sets the steering angle at which the steering torque is equivalent to zero as the corrected base-point steering angle when the target steering torque SFp at the current steering angle starts to match the self-steering force F_ss.

Now, the self-steering force F_ss corresponds to a threshold value according to the braking/driving force applied to the front wheels, which are the turning target wheels, and the vehicle control apparatus 20 corrects the target steering torque at the current steering angle into a value equal to or greater than the self-steering force F_ss (the threshold value) by the shift correction of the base-point steering angle.

In this manner, when providing the braking/driving moment for guiding the vehicle 50 in the target traveling direction, the vehicle control apparatus 20 shifts the base-point steering angle, which is the steering angle that makes the steering torque zero, from the steering angle at which the front-wheel slip angle βf is equivalent to zero in the direction for increasing the target steering torque at the current steering angle, and sets the base-point steering angle at which the target steering torque SFp at the current steering angle reaches or exceeds the self-steering force F_ss as the corrected base-point steering angle.

For example, when the target steering torque SFp indicated at the point A in FIG. 5 is generated and the braking is applied to the front left wheel, if the target steering torque SFp indicated at the point A is smaller than the self-steering force F_ss, this leads to giving such a sensation that the steering is being turned in the leftward direction to the driver.

At this time, the vehicle control apparatus 20 changes the base-point steering angle and generates the target steering torque SFp at the point B in FIG. 5, thereby preventing the steering from being turned due to the self-steering and thus preventing the driver from feeling uncomfortable.

On the other hand, if the target steering torque SFp at the current steering angle is equal to or greater than the self-steering force F_ss in the characteristic regarding the generation of the steering torque based on the base-point steering angle temporarily determined in step S250, this leads to a success to suppress the self-steering in which the steering is being turned according to the braking/driving even without correcting the base-point steering angle temporarily determined in step S250.

Therefore, the vehicle control apparatus 20 proceeds to step S290, and sets the base-point steering angle temporarily determined in step S250, i.e., the steering angle at which the front-wheel slip angle βf is equivalent to zero directly as the corrected base-point steering angle.

Then, in step S300, the vehicle control apparatus 20 sets the corrected base-point steering angle set in step S280 or step S290 as the final base-point steering angle.

In this manner, the vehicle control apparatus 20 calculates the base-point steering angle, which is the signal regarding the steering correction torque, based on the front-wheel slip angle βf calculated from the vehicle body slip angle βs and the self-steering force F_ss calculated from the target braking/driving force TGFx(-).

Next, the vehicle control apparatus 20 proceeds to step S310, and calculates the gain of the steering torque for correcting the steering torque according to the behavior of the vehicle 50.

As the processing for calculating the gain, for example, the vehicle control apparatus 20 can correct the gain in a direction for slightly correcting the steering torque or in a direction for considerably correcting the steering torque according to the vehicle-body slip angle βs calculated in step S150.

For example, when the spin behavior (the vehicle-body slip angle (βs) of the vehicle 50 increases, the vehicle control apparatus 20 changes the gain of the steering torque to a smaller value to thus reduce the steering torque and increase the flexibility of the steering operation performed by the driver for correcting the vehicle behavior (the spin), thereby being able to ease the uncomfortable feeling that the driver might have toward the steering.

Further, the vehicle control apparatus 20 can calculate the gain of the steering torque to prevent the self-steering from occurring due to the braking/driving moment to provide to guide the vehicle 50 in the target traveling direction.

More specifically, the vehicle control apparatus 20 prevents the self-steering from occurring by shifting the base-point steering angle in step S250 to step S290, but the vehicle control apparatus 20 can prevent the self-steering from occurring by changing the gain of the steering torque to generate the target steering torque SFp equal to or greater than the self-steering force F_ss.

Figure 6:
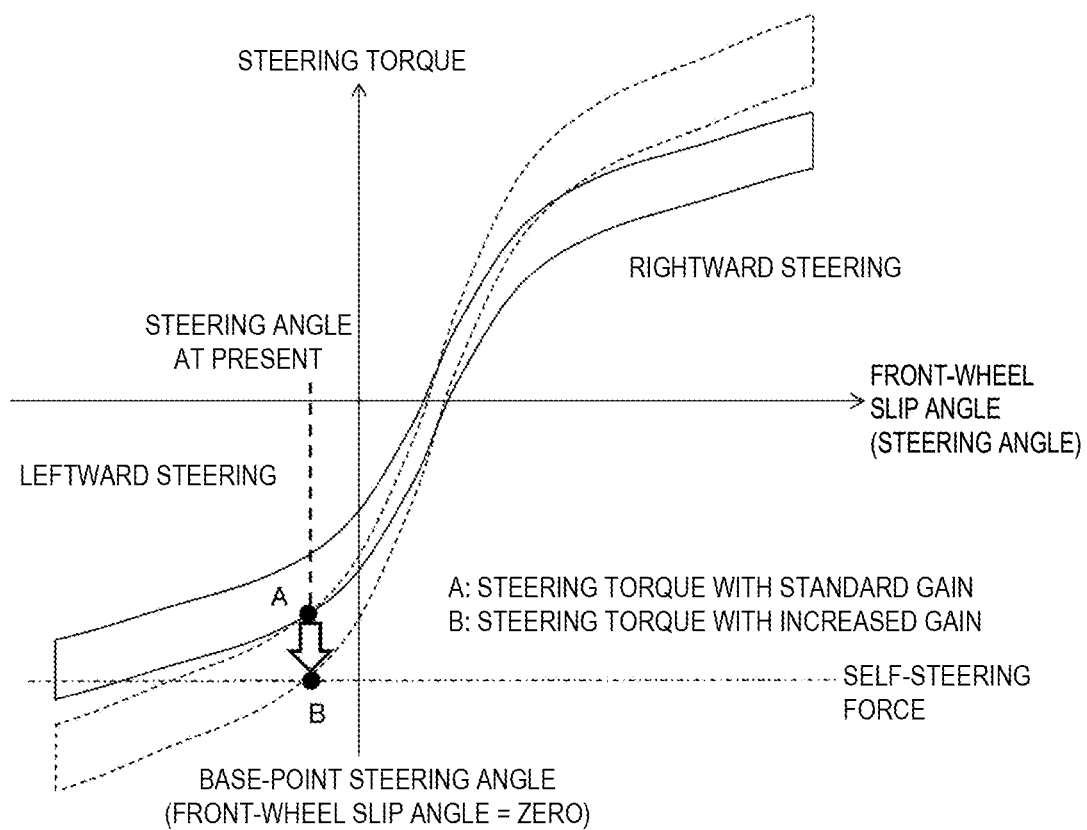
FIG. 6 is a diagram illustrating a setting of the gain of the steering torque.

FIG. 6 illustrates the processing for calculating the gain of the steering torque for preventing the self-steering from occurring.

A point A in FIG. 6 indicates the target steering torque SFp generated at the steering angle at present when a standard gain is employed, and a point B indicates the self-steering force F_ss.

In this case, the vehicle control apparatus 20 calculates the gain for increasing the target steering torque SFp generated at the steering angle at present to a value equal to or greater than the self-steering force F_ss (the gain=B/A), and the steering force controller 40 generates the target steering torque based on the gain, as a result of which the self-steering can be prevented from occurring.

In other words, when providing the braking/driving moment for guiding the vehicle 50 in the target traveling direction, the vehicle control apparatus 20 increases the target steering torque at the current steering angle to a value equal to or greater than the self-steering force F_ss, thereby preventing the self-steering from occurring due to the braking/driving moment.

The vehicle control apparatus 20 can prevent the self-steering from occurring by performing at least one of the shift correction of the base-point steering angle and the change in the gain of the steering torque.

Further, the vehicle control apparatus 20 can change the gain of the steering torque for the rightward steering direction and the leftward steering direction individually separately so as to facilitate the convergence of the behavior of the vehicle 50.

Figure 7:
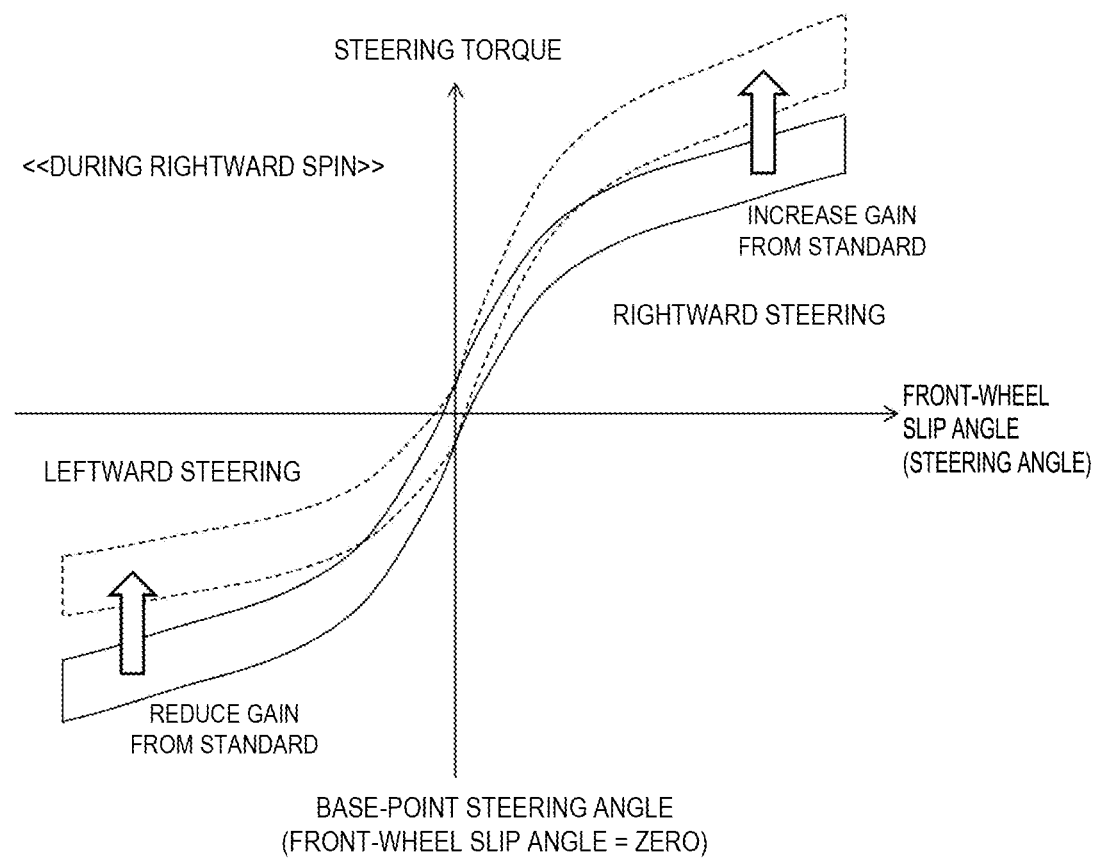
FIG. 7 is a diagram illustrating the setting of the gain of the steering torque for suppressing a spin.

FIG. 7 illustrates processing for changing the gain for each steering direction.

FIG. 7 illustrates processing for changing the gain of the steering torque when the vehicle 50 is spinning in the rightward direction as one example.

When the vehicle 50 is spinning in the rightward direction, the vehicle control apparatus 20 sets a gain for the rightward steering torque that more significantly changes the target steering torque in the rightward steering direction than standard to facilitate the convergence to the base-point steering angle so as to prevent the driver from performing the rightward steering that would further promote the spin.

Further, at this time, the vehicle control apparatus 20 sets a gain for the leftward steering torque that less changes the target steering torque in the leftward steering direction than standard to allow the driver to easily perform the steering for correcting the rightward spin (countersteering), thereby being able to prompt the driver to perform the steering so as to quickly guide the vehicle 50 in the stabilization direction.

When the vehicle 50 is spinning in the leftward direction, the vehicle control apparatus 20 reduces the gain for the rightward steering torque and increases the gain for the leftward steering torque to restrict the leftward steering that would promote the spin and facilitate the steering for correcting the leftward spin (the countersteering), thereby prompting the driver to perform the steering so as to quickly guide the vehicle 50 in the stabilization direction.

In other words, the vehicle control apparatus 20 changes the target steering torque for each steering angle so as to increase it with respect to the steering direction that matches the direction in which the vehicle 50 is spinning and reduce it with respect to the opposite steering direction therefrom, thereby prompting the driver to perform the steering so as to quickly guide the vehicle 50 in the stabilization direction.

In this manner, the vehicle control apparatus 20 calculates the gain of the steering torque, which is the signal regarding the steering correction torque, based on the vehicle-body slip angle βs (the front-wheel slip angle βf) and the target braking/driving force TGFx(-) (the self-steering force F_ss).

After calculating the gain of the steering torque in step S310, the vehicle control apparatus 20 proceeds to step S320, and transmits the signal regarding the target braking/driving force TGFx(-) to the braking/driving controller 30, which controls the braking apparatus 51 (the braking/driving force actuator).

Upon receiving the signal regarding the target braking/driving force TGFx(-), the braking/driving controller 30 controls the braking apparatus 51 (the braking/driving force actuator) so as to generate the target braking/driving force TGFx(-) on each of the wheels.

Next, the vehicle control apparatus 20 proceeds to step S330, and transmits the signal regarding the base-point steering angle, which is the information about the steering correction torque, to the steering force controller 40, which controls the electric power steering apparatus 53.

Further, in step S340, the vehicle control apparatus 20 transmits the signal regarding the gain of the steering torque, which is the information about the steering correction torque, to the steering force controller 40, which controls the electric power steering apparatus 53.

Upon receiving the signal regarding the base-point steering angle and the signal regarding the gain of the steering torque, the steering force controller 40 generates the target steering torque for each steering angle according to the base-point steering angle and the gain, and outputs a driving instruction directed to the motor 53A of the electric power steering apparatus 53 in such a manner that the detection value of the steering torque by the steering torque sensor 90 becomes closer to the target steering torque, thereby controlling the assist torque to be provided by the electric power steering apparatus 53.

At this time, the steering force controller 40 sets the target steering torque at the steering angle that matches the base-point steering angle to zero, and, further, increases/reduces the target steering torque at each steering angle other than the base-point steering angle according to the gain, thereby determining the correlation between the steering angle and the target steering torque.

Then, the steering force controller 40 compares the target steering torque set according to the detection value of the steering angle by a steering angle sensor 80 and the detection value of the steering torque detected by the steering torque sensor 90, and outputs a motor driving instruction in such a manner that the detection value of the steering torque becomes closer to the target steering torque, thereby controlling the assist torque to be provided by the electric power steering apparatus 53.

In this manner, the vehicle control apparatus 20 can guide the steering performed by the driver in the direction for correcting the behavior of the vehicle 50 while realizing the comfortable steering reaction force by changing the steering torque according to the front-wheel slip angle βf represented by the front-wheel lateral force, and, further, can guide the vehicle 50 in the target traveling direction (i.e., the specified posture and position) by controlling the braking/driving.

Each technical idea described in the above-described embodiments can be used in combination as appropriate within a range not creating a contradiction.

Having described the contents of the present invention specifically with reference to the preferred embodiments thereof, it is apparent to those skilled in the art that the present invention can be embodied by various modifications based on the basic technical idea and teaching of the present invention.

For example, the vehicle control apparatus can be formed by a braking/driving system unit that determines the target braking/driving force and outputs it to the braking/driving controller and a steering system unit that determines the steering correction torque and outputs it to the steering force controller.

Further, the vehicle control apparatus 20 illustrated in FIG. 1 can be divided into a first unit including at least the course trance moment calculation portion 21 and the vehicle-body slip angle calculation portion 22, and a second unit including at least the each-wheel generating target braking/driving force calculation portion 27, the steering torque gain calculation portion 28, and the base-point steering angle calculation portion 29.

In the following description, technical ideas recognizable from the above-described embodiments will be described.

In the following description, technical ideas recognizable from the above-described embodiments will be described.

A control apparatus for an electric power steering apparatus is, as one configuration thereof, a control apparatus for an electric power steering apparatus including a motor configured to generate an assist torque for assisting a steering operation performed by a driver. The control apparatus for the electric power steering apparatus acquires information regarding a front-wheel slip angle, determines a driving instruction directed to the motor in such a manner that a steering reaction force is applied in a direction for reducing the front-wheel slip angle, and outputs the driving instruction.

In a preferable configuration of the control apparatus for the electric power steering apparatus, the control apparatus for the electric power steering apparatus further acquires a signal regarding a steering torque applied to the electric power steering apparatus, sets a target steering torque in such a manner that the target steering torque becomes zero at a steering angle at which the front-wheel slip angle is equivalent to zero, and determines the driving instruction directed to the motor in such a manner that the steering torque becomes closer to the target steering torque.

In a further preferable configuration, the control apparatus for the electric power steering apparatus corrects the target steering torque into a value equal to or greater than a threshold value according to a braking/driving force applied to a front wheel when a moment for guiding a vehicle in a target traveling direction is provided due to control of braking/driving.

In a further preferable configuration, the control apparatus for the electric power steering apparatus increases the target steering torque in a steering direction that matches a direction in which the vehicle spins, and reduces the target steering torque in an opposite steering direction from the direction in which the vehicle spins.

The present invention is not limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-112687 filed on Jun. 13, 2018. The entire disclosure of Japanese Patent Application No. 2018-112687 filed on Jun. 13, 2018 including the specification, the claims, the drawings, and the abstract is incorporated herein by reference in its entirety.

REFERENCE SIGNS LIST

10 . . . vehicle control system
20 . . . vehicle control apparatus
21 . . . course trace moment calculation portion
22 . . . vehicle-body slip angle calculation portion
23 . . . front/rear-wheel slip angle calculation portion
24 . . . front-wheel slip angle and steering angle conversion value calculation portion
25 . . . spin suppression moment calculation portion
26 . . . vehicle target behavior calculation portion
27 . . . each-wheel generating target braking/driving force calculation portion
28 . . . steering torque gain calculation portion
29 . . . base-point steering angle calculation portion
30 . . . braking/driving controller
40 . . . steering force controller
50 . . . vehicle
51 . . . braking apparatus (braking/driving actuator)
53 . . . electric power steering apparatus (steering actuator)
60 . . . external world recognition sensor
70 . . . vehicle motion state detection sensor

The invention claimed is:
1. An apparatus comprising:
a vehicle control apparatus, wherein the vehicle control apparatus is configured to:

output a signal regarding a target braking/driving force configured to guide a vehicle in a target traveling direction to a braking/driving controller configured to control a braking/driving actuator of the vehicle, the signal regarding the target braking/driving force being acquired based on information regarding a running route of the vehicle that is input from an external world recognition sensor and a physical amount regarding a motion state of the vehicle that is input from a vehicle motion state detection sensor, output a signal regarding a steering correction torque for correcting a steering torque according to a behavior of the vehicle to a steering force controller configured to control a steering actuator of the vehicle, the signal regarding the steering correction torque being acquired based on a vehicle-body slip angle of the vehicle and the target braking/driving force, the vehicle-body slip angle being acquired based on the physical amount regarding the motion state of the vehicle, and set a base-point steering angle that makes the steering torque zero to a steering angle at which a front-wheel slip angle acquired based on the vehicle-body slip angle is equivalent to zero, and outputs a signal regarding the base-point steering angle to the steering force controller as the signal regarding the steering correction torque wherein the base-point steering angle is variably set according to the front-wheel slip angle and the target braking/driving force.

2. The apparatus according to claim 1, wherein the apparatus outputs a signal regarding a gain of the steering torque that is acquired based on the vehicle-body slip angle to the steering force controller as the signal regarding the steering correction torque.

3. The apparatus according to claim 1, wherein the apparatus outputs a signal regarding a gain of the steering torque that is acquired based on the target braking/driving force to the steering force controller as the signal regarding the steering correction torque.

4. The apparatus according to claim 1, wherein the apparatus outputs a signal regarding a base-point steering angle that makes the steering torque zero, the base-point steering angle being acquired based on the target braking/driving force, to the steering force controller as the signal regarding the steering correction torque.

5. A vehicle control method comprising:

acquiring a signal regarding a target braking/driving force configured to guide a vehicle in a target traveling direction based on information regarding a running route of the vehicle that is input from an external world recognition sensor and a physical amount regarding a motion state of the vehicle that is input from a vehicle motion state detection sensor;

outputting the acquired signal regarding the target braking/driving force to a braking/driving controller configured to control a braking/driving actuator of the vehicle;

acquiring a signal regarding a steering correction torque for correcting a steering torque according to a behavior of the vehicle based on a vehicle-body slip angle of the vehicle and the target braking/driving force, the vehicle-body slip angle being acquired based on the physical amount regarding the motion state of the vehicle;

outputting the acquired signal regarding the steering correction torque to a steering force controller configured to control a steering actuator of the vehicle;

setting a base-point steering angle that makes the steering torque zero to a steering angle at which a front-wheel slip angle acquired based on the vehicle-body slip angle is equivalent to zero; and outputting a signal regarding the base-point steering angle to the steering force controller as the signal regarding the steering correction torque wherein the base-point steering angle is variably set according to the front-wheel slip angle and the target braking/driving force.

6. A vehicle control system comprising:

a apparatus configured to output a signal regarding a target braking/driving force configured to guide a vehicle in a target traveling direction, the signal regarding the target braking/driving force being acquired based on information regarding a running route of the vehicle that is input from an external world recognition sensor and a physical amount regarding a motion state of the vehicle that is input from a vehicle motion state detection sensor, and a signal regarding a steering correction torque for correcting a steering torque according to a behavior of the vehicle, the signal regarding the steering correction torque being acquired based on a vehicle-body slip angle of the vehicle and the target braking/driving force, the vehicle-body slip angle being acquired based on the physical amount regarding the motion state of the vehicle;

a braking/driving controller configured to receive an input of the signal regarding the target braking/driving force output from the vehicle control apparatus and control a braking/driving actuator of the vehicle; and a steering force controller configured to receive an input of the signal regarding the steering correction torque output from the vehicle control apparatus and control a steering actuator of the vehicle, wherein the vehicle control apparatus sets a base-point steering angle that makes the steering torque zero to a steering angle at which a front-wheel slip angle acquired based on the vehicle-body slip angle is equivalent to zero, and outputs a signal regarding the base-point steering angle to the steering force controller as the signal regarding the steering correction torque wherein the base-point steering angle is variably set according to the front-wheel slip angle and the target braking/driving force.

* * * * *